United States Patent [19]

Burfiend

[11] Patent Number: 4,570,970
[45] Date of Patent: Feb. 18, 1986

[54] MULTIPLE AXLE STABILIZING SYSTEM

[76] Inventor: George Burfiend, Box 6071, Spokane, Wash. 99207

[21] Appl. No.: 655,070

[22] Filed: Sep. 27, 1984

[51] Int. Cl.⁴ .............................................. B60G 5/00
[52] U.S. Cl. .................................... 280/680; 280/686
[58] Field of Search ................ 280/104, 676, 680, 686

[56] References Cited

U.S. PATENT DOCUMENTS

| | | | |
|---|---|---|---|
| 1,699,530 | 1/1929 | Gurney | 280/680 |
| 1,845,854 | 2/1932 | Tapp | 280/680 |
| 2,999,695 | 9/1961 | Bixby et al. | 280/680 |
| 3,162,463 | 12/1964 | Schmitz | 280/680 |
| 3,199,892 | 8/1965 | Boys | 280/680 |
| 3,313,369 | 4/1967 | Whitehead | 280/680 |

FOREIGN PATENT DOCUMENTS 388496 3/1933 United Kingdom ............... 280/680

Primary Examiner—Joseph F. Peters, Jr.
Assistant Examiner—Kenneth R. Rice
Attorney, Agent, or Firm—Wells, St. John & Roberts

[57] ABSTRACT

A stabilizing system is described for vehicles having multiple axles. The system involves the use of flexible yet nonextensible connecting members that may be mounted to extend between ends of axles (adjacent the wheels) and the vehicle frame. The connector will therefore preferably extend from the axle mount to an anchor point on the vehicle frame opposite the axle mount. The connectors will preferably be parallel to the axles and in a substantially horizontal plane with respect to the frame and ground surface. The connectors will allow relatively free vertical motion of the wheels and associated suspension but will transmit turning forces directly to the frame that would otherwise tend to bind the axles at their mounting bushings during turning movements of the associated vehicle. Transmission of these horizontal forces to the frame eliminates significant wear between the mounting points for the vehicle suspension, wheels, and frame.

4 Claims, 3 Drawing Figures

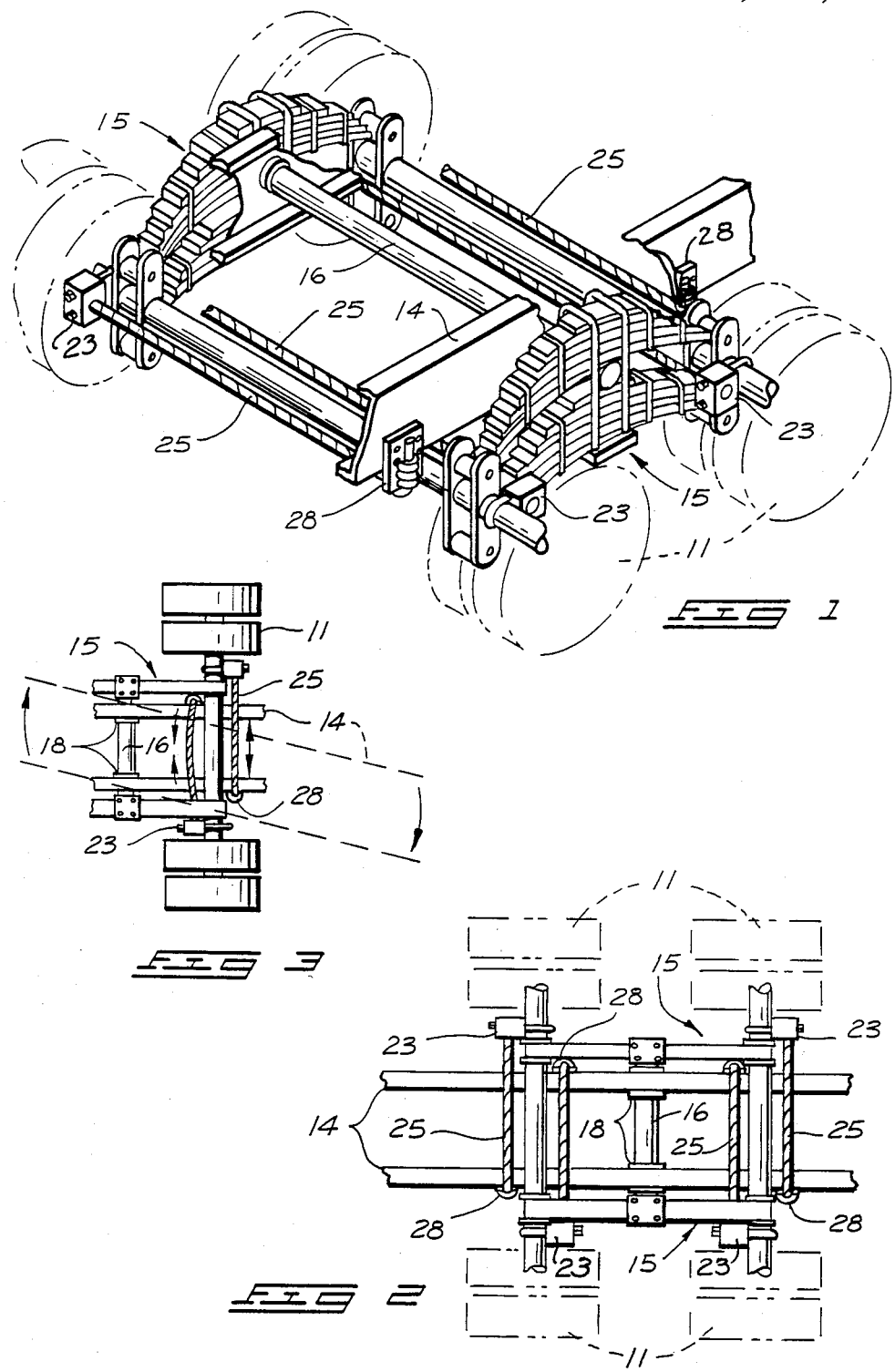

MULTIPLE AXLE STABILIZING SYSTEM

FIELD OF THE INVENTION

The present invention relates to stabilization of multiple axles under vehicle frames against undesired horizontal angular axle movement.

BACKGROUND OF THE INVENTION

Multiple axle vehicles such as medium and heavy-duty trucks and trailers exhibit a tendency to excessive wear at various points of suspension under the vehicle frame. This is due at least in part to the natural tendency for the axles to remain moving along a straight path, tangent in relation to a curve being turned. Forces are developed as the vehicle turns that urge the axles toward radial orientations. These forces strain the suspension-frame mounting bushings and cause premature wear.

It remains desirable though to allow maximum vertical travel of the wheels relative to the vehicle frame. Such movement should be taken up by the suspension rather than being transmitted directly to the frame.

The problem is then how to limit or stabilize the axles horizontally while allowing relatively free vertical motion. Various developments have been made for stabilizing tandem axles against torsional motion under braking loads. When brakes are applied, the axles have a tendency to twist or rotate about their axes.

Rigid struts or torque bars as shown in U.S. Pat. Nos. 2,999,695 to Bixby, or 3,313,369 to Whitehead longitudinally extend between brackets and frame at the center of the axles. Rigid torque bars serve their intended purpose to stabilize the axle against torquing but have little resistance to angular horizontal motion. In fact, the torque bar mounts themselves suffer the same undue wear from forces that tend to reposition the axles radially to the centers of turns.

The problem is more directly addressed by Joseph Schmitz who discloses a twin axle tracking system in U.S. Pat. No. 3,162,463. The Schmitz system is a complete tandem suspension involving rigid connector members extending from axles to a frame member between the axles. The remainder of the suspension is designed so the axles are allowed to swing to radial positions relative to the centers of encountered curves. The solution represented is thus to replace an existing suspension and axle assemblies with an assembly that will allow the axles to shift horizontally under the frame.

It remains desirable, however, for a stabilizing system that can be easily retrofitted to existing tandem axle-suspension vehicles, and that will hold the existing axles against angular horizontal motion.

U.S. Pat. No. 3,199,892 to Boys discloses a vehicle spring suspension that deals primarily with the torquing problem involved as discussed above. The solution offered by Boys, however, differs from the rigid connectors disclosed by Whitehead and Bixby in that extensible cylinders are used to interconnect the axle and frame members. The cylinder is actuated in conjunction with the vehicle brakes to prevent torsional movement of the axle. This represents an adequate solution to the brake torsion difficulty often experienced in trailers having wheel brake assemblies, but does not deal with the problem of horizontal forces applied during turning.

Of the above disclosed references, none show or suggest an adequate solution to the problem of providing stabilization of multiple axles against horizontal forces encountered in turning while permitting relatively free vertical motion thereof. Furthermore, none provide or suggest a solution that will enable use of existing axle and suspension components with such stabilization.

BRIEF DESCRIPTION OF THE DRAWINGS

The invention is illustrated in the accompanying drawings, in which:

FIG. 1 is a fragmented pictorial view illustrating a form of tandem axle suspension with the present invention mounted thereto;

FIG. 2 is a plan view of the suspension illustrated in FIG. 2 with the present system in place thereon; and FIG. 3 is a diagrammatic view showing operation of the present system on a tandem axle frame during a turn.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

FIGS. 1-3 illustrate a typical form of vehicle suspension for mounting standard vehicle wheels 11 to transverse axles 12. The tandem or multiple axle arrangement makes use of parallel transverse axles carried by spring suspensions as shown at 15 on a longitudinally oriented vehicle frame 14. The springs 15 carry the tandem axles 12 substantially independently of the vehicle frame by various bearings or bushings 18 connecting the spring suspensions via a "third axle" 16 to the vehicle frame.

The present invention is intended to remove excessive strain at the various bearing or bushing locations 18 by stabilizing the associated axles against horizontal angular motion during turning conditions. Such horizontal motion is urged naturally as the vehicle moves about curves. The tendency is for the axles to seek a straight path rather than turn with respect to the center for the curve.

The present system will serve to hold the multiple axles in their transverse orientation relative to the frame regardless of curves encountered. The system will simultaneously permit free vertical motion of the vehicle wheels and suspensions. This is done without inhibiting the function of the associated suspension to isolate the vehicle frame from rough conditions on the roadway surface.

The present system includes axle brackets 23 that may be secured to the vehicle axles 12. It is preferred that the axle brackets 23 be situated along the axles 12 adjacent to the associated vehicle wheels. The brackets 23 may be affixed to the axles by welding or other less permanent form of conventional clamping devices such as U bolts, etc.

The axle brackets 23 each mount an end of a flexible, nonextensible connector 25. The connector may be provided with an appropriate fitting 26 adapted to be secured to a bracket 23. It is noted that there is an individual flexible connector 25 provided for each of the axle brackets 23.

It is preferred that the connectors be formed of a metal cable. Metal cable will allow sufficient flexibility along its length for purposes of the present invention while remaining substantially nonextensible along its length. These two characteristics are important to proper functioning of the present invention.

The remaining ends of the connectors 25 are secured to frame brackets 28. Brackets 28 are welded or otherwise secured rigidly to the vehicle frame. The frame brackets 28 may extend from the frame to mount the connector ends so they will assume a substantially horizontal orientation across the vehicle frame.

The frame brackets 28 are preferably aligned transversely along the frame with the axle brackets 23. This positioning may best be noted with reference to FIG. 2. This spacing produces a parallel relation between the connectors 25 and associated axles.

In mounting the present stabilizing system to an existing vehicle, care is taken to locate the axle brackets 23 at locations along the axles as closely adjacent the associated wheels as possible. The frame brackets 28 are attached to the frame in substantial transverse alignment to the axle brackets.

It is preferred that the spacing be uniform between adjacent axles and frame brackets for the entire system. The spacing can be forward or rearward in relation to the axle brackets. It is important only that the cables clear any existing structure along the vehicle undercarriage. As shown, the cables are spaced to opposite sides of the axles. It could be, however, that both cables could be spaced to the same side of the axle. The function would remain similar.

The angular relationship between the connectors and their associated axles assures secure positioning of the axles in their transverse orientation to the frame. As a turn is encountered, stresses tending to shift the frame relative to the axles are taken up in tension along the appropriate connectors 25. This relationship is shown graphically in FIG. 3. There the tendency for the frame to turn to the dashed line position is resisted by a connector. This is true for turns in any direction due to the cross orientations of the connectors. The stress is taken by the connectors and applied to the frame rather than the various bearings or bushings 18 in the suspension. Premature and undue wear at the bearings or bushings 18 is thereby avoided.

It is pointed out that the entire system can be retrofitted to nearly any existing form of multiple axle vehicle. The drawings illustrate only one form of tandem axle arrangement. It should be understood, however, that the present system can be mounted to other suspension forms as well.

In compliance with the statute, the invention has been described in language more or less specific as to the structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A stabilizing system for a wheeled vehicle having a longitudinal frame and multiple wheels rotatable about parallel transverse axles at opposite sides of the longitudinal frame, the stabilizing system comprising:
    axle brackets rigidly mountable to the axles adjacent the wheels mounted thereon;
    nonextensible, flexible cable-like connectors each having one end attached to an axle bracket and extending to a remaining end; and
    frame brackets mountable to the vehicle frame on opposite sides thereof and mounting the remaining ends of connectors such that horizontal angular motion of the axles relative to the vehicle frame will be resisted by the connectors.

2. In a wheeled vehicle having a longitudinal frame with suspension springs on opposite sides with parallel wheel axles mounted to the suspension springs and wheels on the axles for rotation thereto about parallel transverse axes, a stabilizing system comprising:
    a first set of brackets on the axles adjacent the suspension springs on each side of the frame;
    a second set of brackets corresponding in number to the first set and located on the frame, with each bracket of the second set being spaced across the frame from a corresponding bracket of the first set; and
    nonextensible flexible connectors each extending between a bracket of the first set on the axles adjacent one side of the frame and corresponding brackets of the second set at an opposite side of the frame.

3. The system as claimed by claim 2 wherein the connectors are substantially parallel to the wheel axles.

4. The system as claimed by claim 2 wherein the connectors are formed of flexible metal cable.

* * * * *